No. 758,891. Patented May 3, 1904.

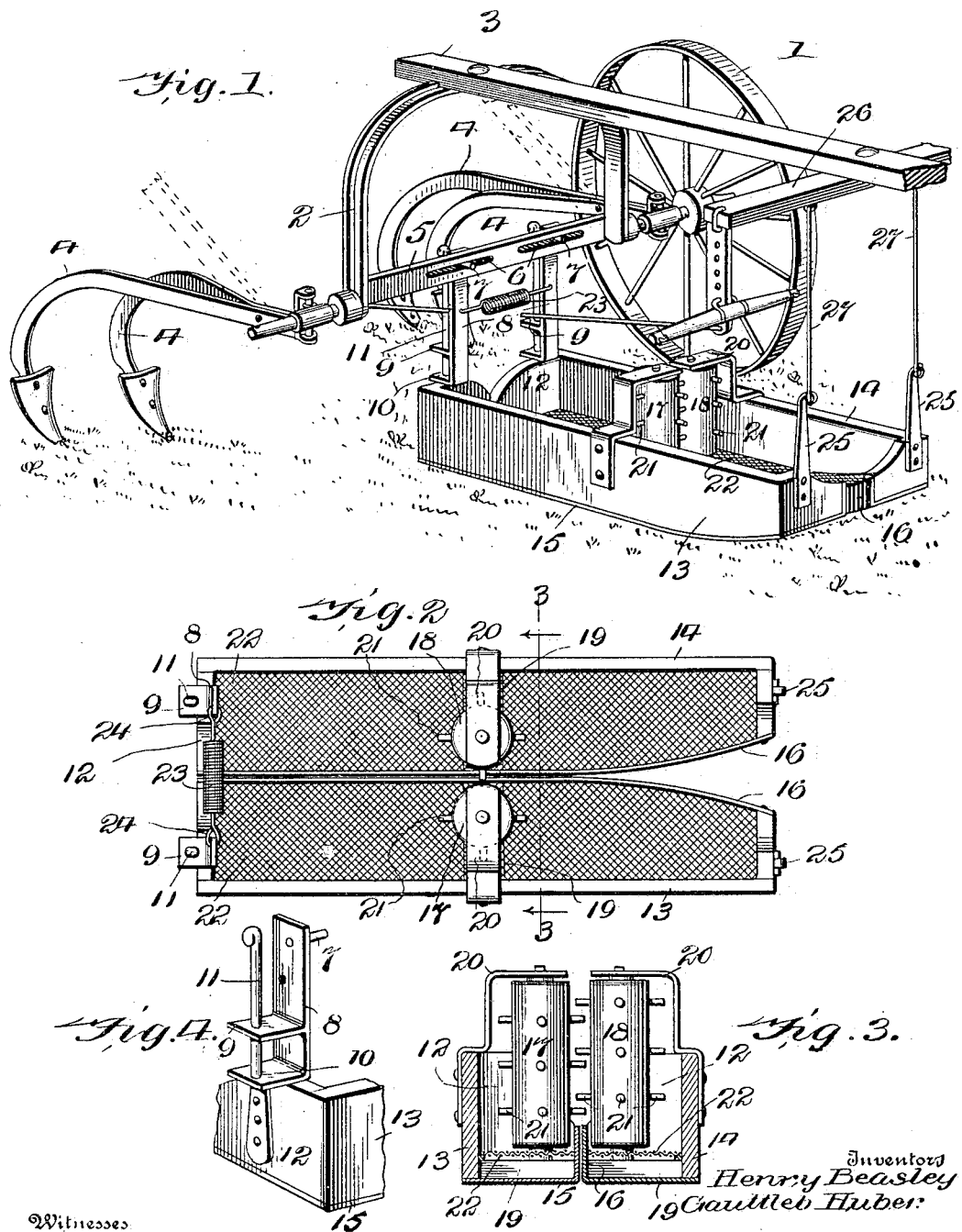

UNITED STATES PATENT OFFICE.

HENRY BEASLEY AND GAUTTLEB HUBER, OF DOT, TEXAS.

INSECT-DESTROYER.

SPECIFICATION forming part of Letters Patent No. 758,891, dated May 3, 1904.

Application filed December 4, 1903. Serial No. 183,756. (No model.)

*To all whom it may concern:*

Be it known that we, HENRY BEASLEY and GAUTTLEB HUBER, citizens of the United States, residing at Dot, in the county of Falls and State of Texas, have invented certain new and useful Improvements in Insect-Destroyers; and we do hereby declare the following to be a full, clear, and exact description of the invention, such as will enable others skilled in the art to which it appertains to make and use the same.

Our invention relates to machines for catching and destroying harmful insects; and it consists of certain novel features of combination and construction of parts, the preferred form whereof will be hereinafter clearly set forth.

The prime object of our invention is to provide suitable mechanism whereby harmful insects may be taken from growing plants, as cotton, corn, or the like, without injury to the plant, but with absolute certainty of destruction to the insects feeding thereon.

Other objects and advantages will be hereinafter made clearly apparent, reference being had to the accompanying drawings, which are made a part of this application, and in which—

Figure 1 shows a perspective view of our invention complete as applied upon an ordinary cultivator. Fig. 2 shows a top plan view of our invention complete separated from the other parts shown in Fig. 1. Fig. 3 is a transverse section of Fig. 2 on line 3 3 looking in the direction indicated by the arrows. Fig. 4 is a perspective view showing preferred means of attaching our invention to the cultivator or plow frame.

For convenience of reference numerals will be employed, the same numeral applying to a similar part throughout the several views, and, referring to the numerals on the drawings, 1 indicates the carrying-wheel, while 2 designates the frame and 3 the draft-tongue of an ordinary cultivator, to which the plows or shovels 4 are attached in the usual manner.

To the cultivator-frame 2 we connect in any preferred way the cross-bar 5, having the longitudinal slots 6 formed therein to receive the fingers 7 upon the standards 8, said standards having at their lower ends rearwardly-turned extensions or brackets 9 and 10, each having an aperture registering with the other to receive and permit the free upward and downward play of the shaft 11, the lower end of which is secured to the rear end 12 of the trough-like members 13 and 14.

The trough-sections 13 and 14 are provided with a sheet-iron or other form of metallic bottom, as indicated by the numeral 15, the forward ends of each trough-section being curved upward, whereby they will more readily pass over uneven surfaces or obstructing roots, snags, or the like that may be in the field. The inner sides of each trough-section are curved outward at their forward ends, as indicated by the numeral 16, whereby the open space thus provided will more readily receive and permit the free passage of the growing plants between the trough-sections, and in order that the destroying insects, worms, or the like upon the growing plants may be dislodged therefrom and shaken into one or the other of the adjacent trough-sections we provide the rotating agitators 17 and 18, each being vertically disposed and each provided with a suitable journal at each end whereby they may be rotatably mounted in position, as by the lower journal entering the cross-bar 19, carried by each trough-section, while the upper journals enter apertures in the brackets 20.

Each of the agitators is provided with a plurality of fingers 21 of proper length to permit the free rotation of each of the agitators or rollers, such rotation being induced by the force of the fingers coming in contact with the growing plant, and it therefore follows that the various parts of the plant will be touched or agitated sufficiently to dislodge harmful insects feeding thereon, from whence they will fall into one of the trough-sections 13 or 14.

By reference to Fig. 3 it will be observed that the metallic bottom section 15 is properly shaped to form the inner edges and sections 15. In Fig. 3 it will also be observed that we have secured the floor-section 22, made of meshed wire, said meshed wire being located slightly above the bottom of the trough, and as said trough-section is made with non-leaking joints we are enabled to partly fill the same with oil, so that a layer of oil will cover the entire bottom. The object of the oil is to destroy the insects forced therein, while the purpose subserved by the false bottom or meshed-wire section 22 is to arrest the downward course of the leaves, blades, and other objects which it is desirable shall not enter the oil-receptacle.

The agitators or rollers 18 being of light construction will readily rotate upon the slightest application of force to the fingers 21, as by the growing plants passing between the trough-sections, the rear ends of the trough-sections being yieldingly secured together, as by means of the coiled spring 23, each end of which is provided with a hook-terminal 24, adapted to hook into an aperture provided in the standards 8.

It will be understood that the tension of the spring 23 is of sufficient force to permit the trough-sections to yieldingly move away from the growing plants without injuring the same, each of the trough-sections being provided with the vertically-disposed rod 11 upon its rear end 12, and as said rod passes loosely through the apertures in the brackets 9 and 10 it follows that said trough-sections will be forced over the ground and at the same time will be permitted to accommodate themselves to the uneven surface of the soil inasmuch as said rod 11 will play freely upward and downward in the brackets 9 and 10.

The forward end of each trough-section is provided with the upwardly-extending arm or bracket 25, adapted to be connected to a contiguous part of the doubletree 26, as by the link-sections 27, it being understood that in some instances a chain or a jointed rod may be employed in order that the forward ends of the trough-sections may more readily conform to the varying surface of the ground.

By the construction and arrangement of parts herein described and illustrated in the accompanying drawings it will be seen that we have provided simple though reliably efficient mechanism of the character specified for destroying harmful insects, worms, &c., upon cotton, plants, corn, and, in fact, upon all variety of cultivated growths, and believing that the construction and manner of using our invention have thus been made clearly apparent further description is deemed unnecessary.

Having thus fully described our invention, what we claim as new, and desire to secure by Letters Patent, is—

The herein-described machine for gathering and destroying insects, comprising a pair of trough-like receptacles 13 and 14 each having a bottom section proper 15 and a false bottom 22 of meshed wire, said receptacles being adapted to contain a destructive agent as oil or the like; agitating devices 17 and 18 carried by each trough-section and having fingers to dislodge from the plants passing between them insects or the like; means to yieldingly hold the trough-sections together and additional means to operatively connect said members to a cultivator or the like whereby when the receptacles are drawn over the ground the same will be passed upon either side of a row of growing plants and thereby gather from said plants all harmful insects, &c., whereby they will be destroyed by falling into said oil, all combined substantially as specified and for the purpose set forth.

In testimony whereof we affix our signatures in presence of two witnesses.

HENRY × BEASLEY.
his mark

GAUTTLEB × HUBER.
his mark

Witnesses:
  D. R. BIRKES,
  JOHN MEYER.